United States Patent
Maeda

(10) Patent No.: US 8,034,267 B2
(45) Date of Patent: Oct. 11, 2011

(54) COMPOSITE SOLID TIRE AND METHOD OF PRODUCING SAME

(75) Inventor: Sadao Maeda, Okazaki (JP)

(73) Assignee: Maeda Shell Service Co., Ltd., Okazaki-Shi (JP)

( * ) Notice: Subject to any disclaimer, the term of this patent is extended or adjusted under 35 U.S.C. 154(b) by 1298 days.

(21) Appl. No.: 11/625,370

(22) Filed: Jan. 22, 2007

(65) Prior Publication Data

US 2007/0114688 A1    May 24, 2007

Related U.S. Application Data

(62) Division of application No. 11/060,133, filed on Feb. 17, 2005, now abandoned.

(30) Foreign Application Priority Data

Mar. 9, 2004    (JP) ................... 2004-066104

(51) Int. Cl.
*B29D 30/54*    (2006.01)
*B60C 7/00*    (2006.01)

(52) U.S. Cl. ............ 264/36.14; 264/319; 156/112; 156/404

(58) Field of Classification Search ........... 156/128.1, 156/112, 404; 264/36.14, 319
See application file for complete search history.

(56) References Cited

U.S. PATENT DOCUMENTS

| | | | |
|---|---|---|---|
| 1,394,928 A * | 10/1921 | Midgley | 156/130.5 |
| 3,815,200 A * | 6/1974 | Adams | 29/894.32 |
| 3,986,802 A * | 10/1976 | Isom | 425/35 |
| 4,164,251 A | 8/1979 | Chung | |
| 4,669,517 A * | 6/1987 | Krishnan | 152/209.5 |
| 5,254,405 A | 10/1993 | Panaroni et al. | |
| 6,005,397 A * | 12/1999 | Zoughi et al. | 324/644 |
| 6,103,377 A * | 8/2000 | Clausi | 428/397 |
| 6,267,084 B1 * | 7/2001 | Louchart, III | 122/4 D |
| 6,303,060 B1 * | 10/2001 | Lobo et al. | 264/45.7 |
| 6,872,271 B2 | 3/2005 | Nowotarski | |
| 2004/0132880 A1* | 7/2004 | Durel et al. | 524/262 |

FOREIGN PATENT DOCUMENTS

| | | |
|---|---|---|
| CN | 1062692 A1 | 7/1992 |
| CN | 1460591 A1 | 12/2003 |
| DE | 2755111 | 6/1979 |
| DE | 3711038 | 10/1987 |
| EP | 0157717 | 10/1985 |
| EP | 0 720 923 | 7/1996 |
| EP | 1 262 301 | 12/2002 |
| GB | 2264502 * | 2/1992 |
| GB | 2 264 502 | 9/1993 |
| JP | 05-031822 A1 | 2/1993 |
| JP | 2002-14442 A1 | 5/2002 |
| WO | WO 02/083782 * | 10/2002 |

OTHER PUBLICATIONS

U.S. Appl. No. 11/007,776, filed Dec. 8, 2004, Maeda.
Zhiping Lu, et al., "Synthesis of Polyurethane Elastomers Using 1,5-naphthalene Diisocyanate," Synthetic Rubber Industry, 19(3), 1996, pp. 185-187.

* cited by examiner

*Primary Examiner* — Richard Crispino
*Assistant Examiner* — Martin Rogers
(74) *Attorney, Agent, or Firm* — Burr & Brown

(57) ABSTRACT

A composite solid tire, including a worn solid rubber tire having a remaining rubber layer, and a thermo-setting polyurethane elastomer layer which is provided on an outer circumferential surface of the rubber layer.

14 Claims, 4 Drawing Sheets

⇩ SETTING

⇩ CASTING

⇩ REMOVING

⇩ FINISHING

COMPOSITE SOLID TIRE AND METHOD OF PRODUCING SAME

CROSS-REFERENCE TO RELATED APPLICATIONS

This application is a division of U.S. application Ser. No. 11/060,133, filed Feb. 17, 2005, which claims the benefit of Japanese Patent Application No. 2004-066104, filed Mar. 9, 2004, the entireties of which are incorporated herein by reference.

BACKGROUND OF THE INVENTION

1. Field of the Invention

The present invention relates to a composite solid tire and a method of producing the same, and particularly to advantageous techniques for renewing worn solid rubber tires.

2. Discussion of Related Art

As a tire that supports, in a vehicle such as an automotive vehicle or an industrial vehicle, a load and has the function of smoothly transmitting forces between the vehicle and road surface, there have conventionally been known two sorts of tires, i.e., a pneumatic tire having a hollow structure in which air is charged, and a solid tire having a solid structure constituted by a rubber-based annular body. In particular, the solid tire enjoys, as tire's functions, a load supporting property, a cushioning property, and a rubber elasticity, and is widely used in low-speed and high-load vehicles such as a forklift truck, an industrial tractor, a battery carrier, or a trailer. As predominant sorts of the solid tire, there are known a tire that is constituted by a single tread rubber and is directly bonded to a wheel, a tire that is constituted by a rubber adhered, by vulcanization, to a base band and is press-fitted onto a wheel, and a tire that is constituted by an annular tread rubber and is fitted on an outer circumferential portion of a wheel.

Generally, the solid tire is known as a solid rubber tire that is constituted by a tread rubber formed of, e.g., NR or SBR. Since the solid rubber tire contacts the road surface and produces a frictional force to allow movement of the vehicle, a surface of contact of the tire with the road surface is worn little by little as the tire is used for a long time and, if a life expectancy of the tire is fulfilled, the tire should be disposed of. Recently, however, the disposal of waste tires has become a serious social problem. In particular, since the solid rubber tires are heavier than pneumatic tires used in, e.g., passenger cars, the solid rubber tires are more difficult to handle. In addition, the solid rubber tires are hard to burn or find other applications. Thus, the solid rubber tires are very difficult to dispose of.

In the above-indicated technical background, Patent Document 1 (Japanese Patent Application Publication No. 5-31822) has proposed a pneumatic-type solid tire having a structure in which a surface of a tread portion of a worn tire is subjected to buffing as a sort of polishing and a renewing tread rubber is adhered to the thus polished tread portion. According to this technique, worn tires that have conventionally been difficult to dispose of can be effectively utilized, tire materials can be saved, and times needed to produce tires can be reduced.

However, even though the renewing tread rubber may be adhered to the tread portion of the worn tire, so as to produce a renewed tire, the tread portion of the renewed tire is easily worn again as it is used. Thus, the durability of the tread portion of the renewed tire is not satisfactorily improved. In addition, since rubber materials used to form the renewed tread rubber contain carbon black as a reinforcing agent and accordingly have a black color, black marks of the tire are left on the road surface because frictions are produced between the tread rubber and the road surface. The black tire marks left on the road surface may damage an aesthetic appearance of the road surface and, in a work field where a forklift truck or an industrial tractor is used, not only the black tire marks but also black rubber powder resulting from wearing of tires may damage a work environment.

In addition, Patent Document 2 (Japanese Patent Application Publication No. 2002-144442) discloses a wheel renewing method in which urethane rubber is used. More specifically described, this document discloses a renewed wheel obtaining technique in which, after a rubber portion is removed from a base band of a waste tire, an ether-based urethane rubber layer is formed on an outer circumferential surface of the base band.

In the above-indicated renewed wheel, the urethane rubber layer contacts road surface. The urethane rubber has a higher wear resistance than that of a common tread rubber formed of, e.g., NR or SBR. Thus, the renewed wheel can enjoy a significantly improved durability or life expectancy. On the other hand, the renewed wheel suffers a lower cushioning property than that of a wheel having the common tread rubber. Therefore, when an operator operates a vehicle, such as a forklift truck or an industrial tractor, in which the renewed wheel is used, uncomfortable shocks may be transmitted to the operator. The cushioning property of the renewed wheel might be improved by forming the urethane rubber layer to have a foamed structure or largely lowering the hardness (or increasing the softness) of the urethane rubber layer. In this case, however, the urethane elastomer may lose its proper wear resistance and accordingly its durability.

SUMMARY OF THE INVENTION

It is therefore an object of the present invention to provide a composite solid tire that has not only an excellent wear resistance but also an excellent shock-absorbing or -damping property, and a method of advantageously producing the same. It is another object of the present invention to provide advantageous techniques for renewing a waste solid rubber tire that has been worn to such a degree that its life expectancy has been fulfilled.

According to the present invention, there is provided a composite solid tire, wherein an inner layer of the solid tire is formed of a rubber layer, and an outer layer of the solid tire is formed of a thermo-setting polyurethane elastomer layer.

According to a preferred feature of the present invention, the rubber layer is formed of a worn solid rubber tire, wherein the remaining rubber layer of the worn solid rubber tire has a pre-determined thickness.

According to another preferred feature of the present invention, the rubber layer is formed of at least one material, which is softer than the thermo-setting polyurethane elastomer.

According to a first aspect of the method of the present invention, there is provided a method of producing a composite solid tire comprising the steps of providing a rubber layer to be the inner layer of said tire; applying a primer and an adhesive to an outer circumferential surface of the rubber layer; and forming an outer layer by causing raw materials of a thermo-setting polyurethane elastomer to react and cure by die-casting.

According to a second aspect of the method of the present invention, there is provided a method of producing a composite solid tire comprising the steps of cutting an outer circumferential surface of a remaining rubber layer of a worn solid rubber tire; applying an adhesive to the cut outer circumferential surface of the rubber layer; and providing, on the outer circumferential surface of the rubber layer, a thermo-setting polyurethane elastomer layer by causing raw materials of a thermo-setting polyurethane to react and cure.

According to another preferred feature of the present invention, the composite solid tire producing method is embodied by introducing the raw materials of the thermo-setting polyurethane elastomer into a space in a die-casting device, wherein the space is formed between an inner circumferential surface of an outer die and an outer circumferential surface of the rubber layer, and the inner circumferential surface and the outer circumferential surface are heated in a way that a temperature of the outer circumferential surface is higher than that of the inner circumferential surface.

In addition, the polyurethane elastomer layer as the outer layer of the tread portion of the renewed solid tire does not contain, unlike common rubber layers, any amounts of carbon black. Therefore, unlike conventional solid rubber tires, no black marks of the renewed solid tire (i.e., the tread rubber) are left on the road surface the tire contacts. Thus, the renewed solid tire is freed of the problems that the black marks may damage the aesthetic appearance of the road surface and that scattering of black rubber powder resulting from wearing of tires may damage a work environment. Moreover, the rubber layer as the remaining portion of the worn solid rubber tire is utilized, substantially as it is, as the inner layer of the tread portion of the renewed solid tire. Therefore, an amount of consumption of the raw materials of the polyurethane elastomer can be significantly reduced as compared with the case where an entirety of the tread portion is constituted by a polyurethane elastomer layer only. This advantageously prevents or restrains the cost of the manufacture of the composite solid tire, which has the above-mentioned excellent features, from increasing.

According to the preferred features of the present invention, the rubber layer as the remaining portion of the worn solid rubber tire is utilized, substantially as it is, as the inner layer of the tread portion of the renewed solid tire. Therefore, an amount of consumption of the raw materials of the polyurethane elastomer can be significantly reduced as compared with the case where an entirety of the tread portion is constituted by a polyurethane elastomer layer only. This leads to largely saving the amount of materials used to renew the worn tread portion of the solid tire. Moreover, according to the present invention, worn solid rubber tires can be utilized again as renewed solid tires, the worn solid rubber tires need not be disposed of, so that the present invention contributes to overcome the social problem with the disposal of waste tires.

In the renewed solid tire in accordance with the present invention, an annular tread portion to be attached to an outer circumferential portion of a wheel is constituted by the rubber layer that is a remaining portion of the worn solid rubber tire and has an appropriate thickness, and the room temperature-setting polyurethane elastomer layer that is integrally formed on the rubber layer. Therefore, impacts exerted from road surface to the tread portion can be effectively absorbed or damped by the rubber layer as an inner layer of the tread portion, and the outer polyurethane elastomer layer that provides a contact surface of the tread portion that contacts the road surface enjoys a proper excellent wear resistance of the polyurethane elastomer, and accordingly a significantly improved durability. Thus, the renewed solid tire can enjoy a significantly increased life expectancy.

In addition, according to the present method of manufacturing the composite solid tire, the inner layer formed of the rubber layer and the outer layer formed of the thermo-setting polyurethane elastomer layer are effectively integrated with each other. Moreover, by cutting an outer surface of a remaining rubber layer of a worn solid rubber tire, in which the remaining rubber layer has a pre-determined thickness, and applying the thermo-setting polyurethane elastomer to the rubber layer, the worn solid rubber tire can be advantageously utilized. It is also assured that the thermo-setting polyurethane elastomer layer and the rubber layer can be more effectively formed into an integral structure.

In particular, in the above-mentioned preferred features of the present invention, the raw materials of the thermo-setting polyurethane elastomer, which are introduced into the die-casting device, react and cure from a side of the rubber layer, whose temperature is higher than that of the other side of the rubber layer. Therefore, the feature, in which the thermo-setting polyurethane elastomer layer formed on the rubber layer is further firmly integrated with the rubber layer, is exhibited.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE INVENTION

Hereinafter, there will be described in detail preferred embodiments of the present invention by reference to the drawings.

Figure 1:
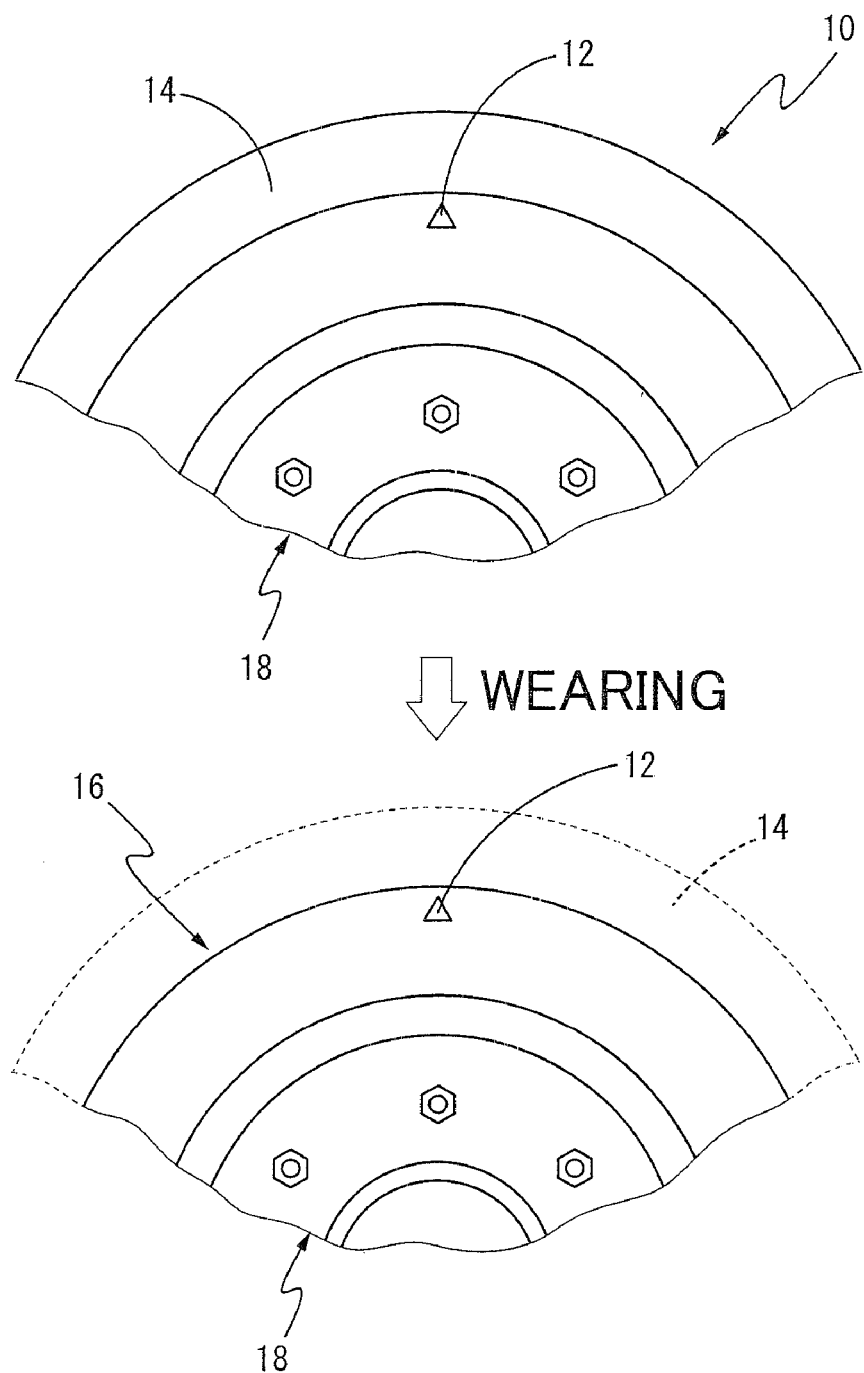
FIG. 1 is a side elevational view of a portion of a solid rubber tire, for explaining respective states of the tire before and after it is worn.

FIG. 1 is a side elevation view of a portion of a solid rubber tire 10 that is attached to a vehicle, not shown, and has not been worn, and a side elevation view of a portion of the same solid rubber tire 10 whose tread portion 14 has been used and worn. FIG. 1 shows the worn solid tire, which provides an annular rubber layer, and which is suitably used for the present invention. More specifically described, the solid rubber tire 10 is formed, as known in the art, of a single sort of rubber, or a blend of two or more sorts of rubbers, that is or are selected from NR, IR, SBR, BR, EPM, EPDM, IIR, and the like. Generally, the solid rubber tire 10 is formed of a blend of rubbers including NR or IR as a main component, and is vulcanized. The solid rubber tire 10 is commercially available as a so-called solid tire. The solid rubber tire 10 has a generally annular shape, and an outer circumferential surface of a wheel 18 fixed to an axle shaft of the vehicle is attached to an inner circumferential portion of the tire 10, by a well known method, such as bonding, press-fitting, or fitting.

The solid rubber tire 10 has, on a side surface thereof, a tread wear indicator (or a tire wear indicator) 12 that indicates a limit of use of the tire 10. The tread wear indicator 12 has, e.g., a triangular shape and is formed by indent or relief. When the tread portion 14 of the solid rubber tire 10 is worn little by little because of repeated friction with road surface and eventually the outer circumferential surface of the tread portion 14 that contacts the road surface reaches the tread wear indicator 12, the solid rubber tire 10, i.e., a worn solid rubber tire 16 should be changed with a new one, because a life expectancy of the tire 10 has been fulfilled.

Figure 2:
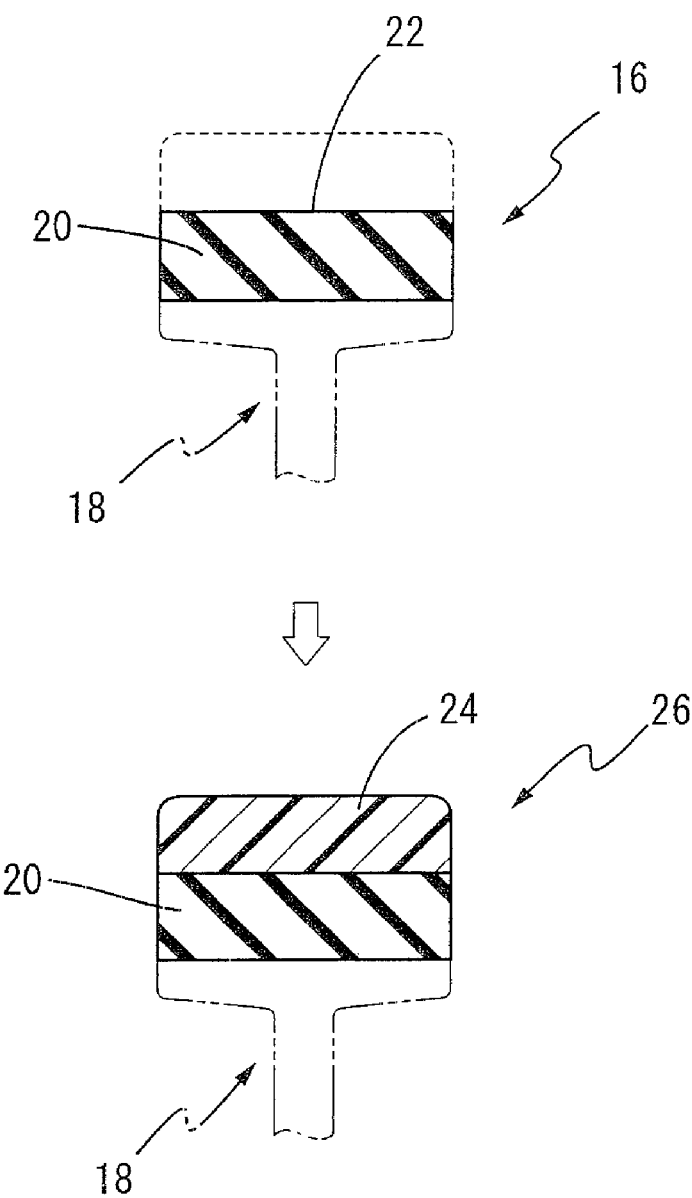
FIG. 2 is a cross-sectional view of a portion of a worn solid rubber tire, and a portion of a composite solid rubber tire in which a thermo-setting polyurethane elastomer layer is formed integrally with the worn solid rubber tire according to the present invention.

According to the present invention, however, the worn solid rubber tire 16 whose life expectancy has been fulfilled is used to advantage. More specifically described, as shown in FIG. 1, the worn solid rubber tire 16 has, as a remaining portion of the solid rubber tire 10, a worn rubber layer 20 that remains along the entire circumference of the wheel 18 and has a pre-determined thickness corresponding to the tread wear indicator 12. As shown in FIG. 2, on an outer circumferential surface of the worn rubber layer 20, a thermo-curing or -setting polyurethane elastomer layer 24 is integrally formed to have a pre-determined thickness and thereby provide a new tread portion 14. Thus, the worn solid rubber tire 16 is renovated into a renewed solid tire (composite solid rubber tire) 26 that can be used again with the vehicle.

The above-indicated polyurethane elastomer layer 24 is integrally formed on the outer circumferential surface of the worn rubber layer 20, by casting, into the die-casting device, conventionally known raw materials of a thermo-curing or -setting polyurethane, so that the renewed solid rubber tire 26 may have a desired thickness. Generally, the raw materials of the thermo-setting polyurethane contain, as a polyisocyanate component, a tolylene diisocyanate (TDI), a diphenylmethane diisocyanate (MDI), and a naphthalene diisocyanate (NDI) or the like, and additionally contain, as a polyol component, a poly(oxybutylene)glycol, polyester polyol, polyethylene adipate glycol or the like. The raw materials additionally contain a diamine, a diol or the like, as a catalyst that causes the polyisocyanate component and the polyol component to react with each other, and cure, while the raw materials are heated. The catalyst can be selected, as needed, from various commercially available products, such as the ones available under commercial name "Adiprene", "Vibrathane", "Multrathane", "Vulkollan", "Hiprene", or the like.

The polyurethane elastomer, which forms the layer 24, has an excellent wear resistance property, as clearly shown in the following TABLE 1. TABLE 1 compares the comparison of the physical properties of "Vulkollan", which is an example of the commercially available elastomers suitable for the present invention, with a commercially available room temperature-setting polyurethane. In the present invention, a polyurethane elastomer, whose characteristic value according to Taber Abrasion Test (DIN 53516) is 90 mm$^3$ or less, preferably 70 mm$^3$ or less, more preferably 50 mm$^3$ or less, is advantageously used.

TABLE 1

| | Measuring method | Polyurethane elastomer | |
|---|---|---|---|
| | | Thermo-setting elastomer (VULKOLLAN) | Room temperature-setting elastomer |
| Hardness (Shore hardness A) | DIN 53505 | 80 | 80 |
| Tensile strength (MPa) | DIN 53504 | 35 | 15 |
| Breaking elongation (%) | DIN 53504 | 800 | 370 |
| Tear strength (KN/m) | DIN 53515 | 65 | 24 |
| Impact resilience (%) | DIN 53512 | 55 | 35 |
| Wear resistance (mm$^3$) | DIN 53516 | 40 | 102 |

As the polyurethane elastomer, which has the excellent wear resistance and is used for the polyurethane elastomer layer 24, NDI elastomer is advantageously used. More specifically described, naphthalene-1,5-diisocyanate (NDI) is used as a polyisocyanate component, and polyester polyol or the like is used as a polyol component. After the two components are reacted with each other, in advance, so as to form an NDI/ester prepolymer, a glycol cross-linking agent, etc. are mixed with the prepolymer, and the resultant mixture is heated, so as to form a desired solid NDI-based elastomer. Thus, the desired layer 24 is formed by a die-casting method in which the polyurethane raw materials are cast into the die-casting device. The raw materials of the polyurethane elastomer having an excellent wear resistance are commercially available; for example, polyurethane raw materials available under commercial name "VULKOLLAN" from Bayer AG, Germany, are advantageously used.

Generally, it is preferred that the materials of the heat-curing polyurethane elastomer used to form the polyurethane elastomer layer 24 be reacted, and cured, at a low heating temperature of, e.g., from 70° C. to 115° C. This assures that the curing of polyurethane materials does not need to subject the rubber layer 20 of the worn solid rubber tire 16 to high temperatures, thereby effectively preventing the properties of the rubber layer 20 from being changed by heat. Therefore, the composite solid rubber tire 26 in which the polyurethane elastomer layer 24 is integrally formed on the rubber layer 20 can advantageously exhibit, against shocks or impacts exerted thereto, the cushioning property of the rubber layer 20. In addition, the durability of the rubber layer 20 and accordingly the life expectancy of the renewed solid rubber tire 26 as a whole can be advantageously improved.

Also, in the renewed solid rubber tire 26 constructed as described above, an outer circumferential surface of the polyurethane elastomer layer 24 provides a contact surface that contacts the road surface. Therefore, the polyurethane elastomer can exhibit its proper wear resistance, and accordingly the renewed solid rubber tire 26 can enjoy a significantly improved life expectancy. In addition, since the rubber layer 20 is present under the polyurethane elastomer layer 24 having the excellent wear resistance, the rubber layer 20 can effectively absorb or damp the impacts transmitted from the road surface to the vehicle, even if a hardness of the rubber layer 24 may be such a level of Shore hardness 80 A or over, while an ordinary rubber layer has a Shore hardness less than 70 A and an ordinary room temperature-setting elastomer has a Shore hardness less than 80 A. Thus, the rubber layer 20 largely contributes to improving, e.g., a driving comfort of the vehicle. In order to advantageously exhibit the effect of presence of the rubber layer 20, it is preferred that a percentage of a thickness of the polyurethane elastomer layer 24 relative to a whole thickness of the renewed solid rubber tire 26 in a radial direction thereof be not more than 40%, more preferably, not more than 30%, and that a percentage of a thickness of the rubber layer 20 relative to the whole thickness of the renewed solid rubber tire 26 be not less than 60%.

Moreover, the polyurethane elastomer layer 24 does not contain, unlike the rubber layer 20, any amounts of carbon black as a reinforcing material. Therefore, although the renewed solid rubber tire 26 is rolled and moved on the road surface, no black marks of the tire 26 are left on the road surface. Thus, the polyurethane elastomer layer 24 contributes to keeping the environment clean. In addition, the elastomer layer 24 has no possibilities of damaging a work environment where the renewed solid rubber tires 26 are produced.

The renewed solid rubber tire 26 constructed as described above according to the present invention is produced by a composite solid tire producing method also according to the present invention. The composite solid tire producing method is based on a known method, e.g., a die-casting method. In the composite solid tire producing method, before the desired thermo-setting polyurethane elastomer layer 24 is formed, the outer circumferential surface 22 of the rubber layer 20 of the worn solid rubber tire 16 is worked, i.e., cut or machined using, e.g., a lathe so as to remove, from the rubber layer 20, a superficial portion thereof having a pre-determined thickness. Thus, oil adhered to the outer surface, and/or impregnated into, the inner mass, of the rubber layer 20, and/or particles biting into the outer surface of the same 20 are removed to assure that the polyurethane elastomer layer 24 can be more effectively bonded to the clean outer surface 22 of the rubber layer 20. On the clean outer surface 22 of the rubber layer 20, a primer layer is formed using a known primer to improve a degree of bonding of the outer surface 22, and additionally an adhesive layer is formed, on the primer layer, using a known adhesive suitable for polyurethanes. Since the primer layer and the adhesive layer are formed on the outer surface 22 of the rubber layer 20, the polyurethane elastomer layer 24 can be more firmly bonded to the rubber layer 20.

After the primer and then the adhesive are applied to the rubber layer 20, the worn solid rubber tire 16 including the worn rubber layer 20 is set in an appropriate die-casting device 32. Subsequently, as shown in FIG. 3, raw materials of a thermo-setting polyurethane are cast in the die-casting device 32.

Figure 3:
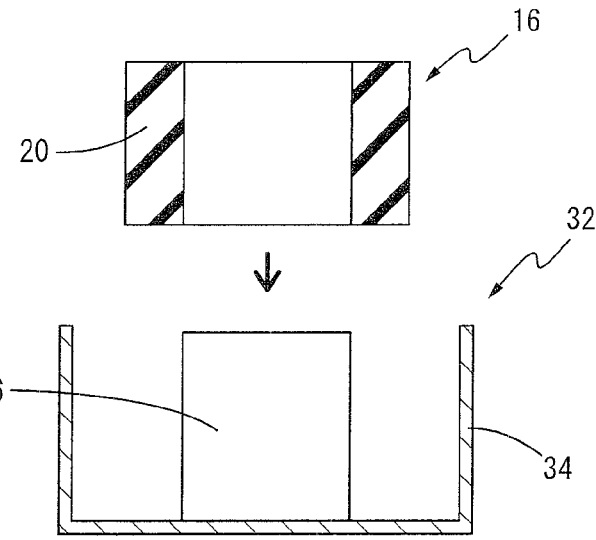
FIG. 3 is a cross-sectional view for explaining steps of a first half portion of a composite solid tire producing method in accordance with the present invention.
Figure 3:
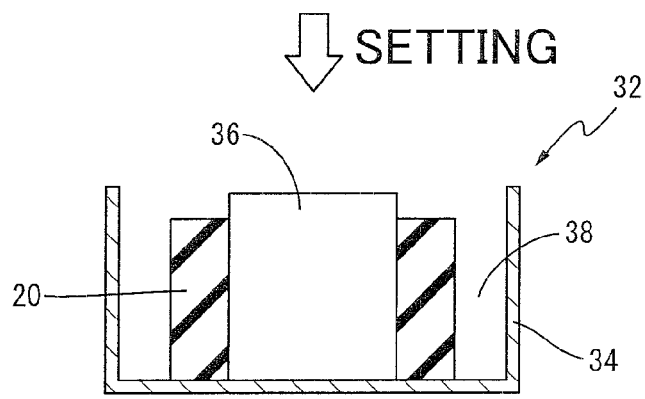
Figure 3:
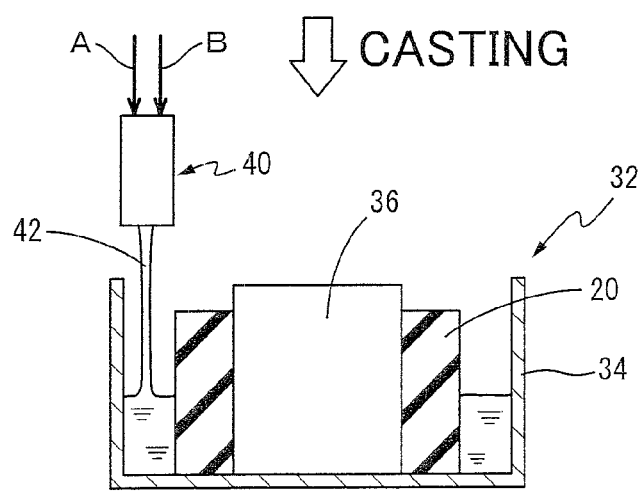

More specifically described, as shown in FIG. 3, the die-casting device 32 includes an outer die 34 having a cylindrical shape and including a bottom wall, and a core-like inner die 36 that is provided in an inner space of the outer die 34 such that the inner die 36 is concentric with the outer die 34. The worn solid rubber tire 16 is set in the die-casting device 32 such that the inner die 36 fits in an inner bore of the tire 16. It is desirable that at least the outer die 34 is pre-heated in a suitable furnace at a pre-determined temperature, for example, at about 100 to 110° C. In this case, it is desirable that the rubber layer 20 of the solid rubber tire 16 is also pre-heated at a temperature higher than that of the pre-heated outer die 34. For example, it is preferable that the temperature of the pre-heated solid rubber tire 16 is at least about 5° C. higher than that of the pre-heated outer die 34. Adaptation of the above-mentioned relationship between the temperature of the outer layer die 34 and that of the lubber layer 20 effectively causes the raw materials of the thermo-setting polyurethane elastomer to react and cure from the side of the rubber layer 20. As a result, thus formed polyurethane elastomer layer 24 and the rubber layer 20 are fixed to each other, much firmer than layers obtained without the adaptation of the above-mentioned relationship. Therefore, the solid tire of the present invention has an advantageously integrated structure.

In this state, a known material casting device 40 casts raw materials 42 of a room temperature-setting polyurethane, into an annular space (i.e., a molding space) 38 located between the outer circumferential surface of the rubber layer 20 of the worn solid rubber tire 16 and the inner circumferential surface of the outer die 34, till the annular space 38 is filled with the raw materials. The material casting device 40 may be one that has a well known construction; such as a mixing head or a gun-type injector. The material casting device 40 is supplied with the polyisocynate component: A, and the polyol component: B, mixed with the curing agent (i.e., the catalyst) and, after the two components are mixed uniformly using an appropriate dynamic or static mixer, the mixture is cast in the die-casting device 32. The polyisocynate component: A and the polyol component: B may be previously reacted to form a pre-polymer before being supplied to the material casting device 40. In this case, the material casting device 40 is supplied with the pre-polymer and the curing agent, and after the two components are mixed, the mixture is cast in the die-casting device 32.

Figure 4:
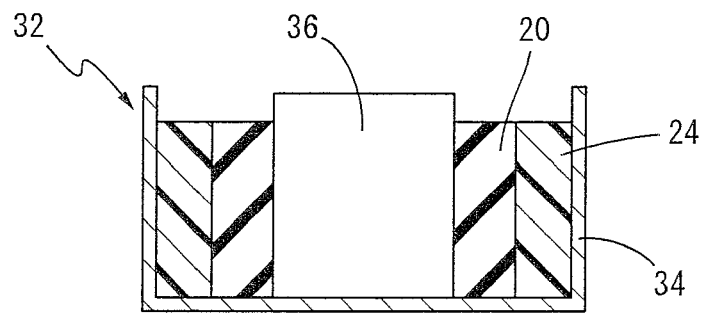
FIG. 4 is a cross-sectional view for explaining steps of a second half portion of the composite solid tire producing method that follows the first half portion shown in FIG. 3.
Figure 4:
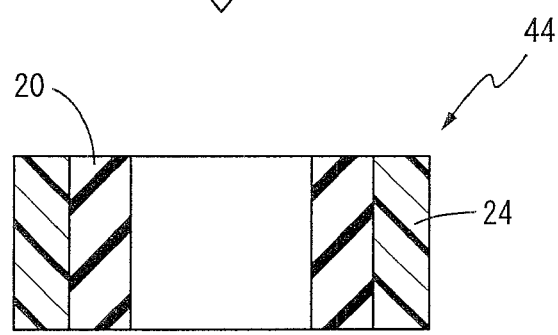
Figure 4:
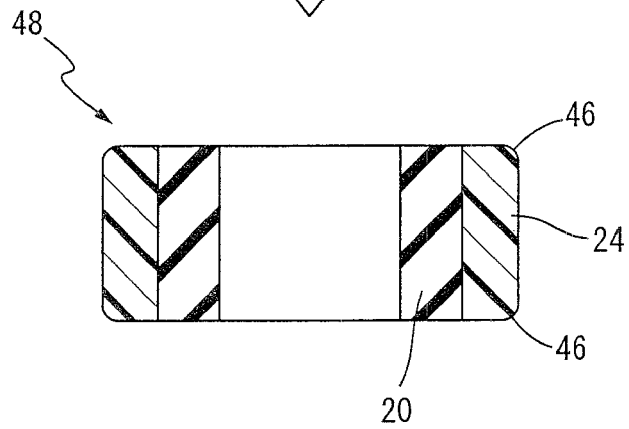

The polyurethane raw materials 42 cast in the die-casting device 32 react and cure, while they are heated. Thus, the polyurethane elastomer layer 24 is integrally formed on the outer surface of the rubber layer 20. Subsequently, as shown in FIG. 4, an integral mold product 44 including the rubber layer 20 and the polyurethane elastomer layer 24 is removed from the die-casting device 32, and is subjected to a finishing operation. More specifically described, widthwise opposite ends of an outer circumferential surface of the polyurethane elastomer layer 24 are rounded to provide rounded portions 46, and are thereby prevented from being chipped off in use. Thus, a desired renewed solid tire 48 is produced.

In the above-described method of producing the composite solid tire 48, the polyurethane raw materials 42 are just cast in the die-casting device 32, so as to integrally form the polyurethane elastomer layer 24 on the outer circumferential surface of the rubber layer 20. Thus, the composite solid tire 48 can be very easily produced. In addition, not all portions of the composite solid tire 48 are formed of the polyurethane elastomer, but just the polyurethane elastomer layer 24 is integrally formed on the outer surface of the worn rubber layer 20 remaining with the pre-determined thickness along the entire circumference of the wheel 18. Thus, the present composite solid tire producing method is economical since the amount of use of the polyurethane raw materials 42 is considerably small.

The composite solid tire 48 produced by the method shown in FIGS. 3 and 4 is attached to the wheel 18, and is used with the vehicle, such that the wheel 18 is fixed to the inner bore of the tire 48 by a conventionally known method such as bonding, press-fitting, or fitting. Thus, the composite solid tire 48 can enjoy the above-described special advantages of the polyurethane elastomer layer 24 formed on the rubber layer 20.

In summary, the renewed solid tire in accordance with the present invention can enjoy a significantly improved life expectancy, and can exhibit a significantly improved shock absorbing or damping effect against shocks exerted from road surface to a body of a vehicle. In addition, no black marks of the tire are left on the road surface, which largely contributes to keeping an aesthetic appearance of the environment and improving a work environment. In addition, since, according to the present invention, worn solid rubber tires can be utilized again as renewed solid tires, the worn solid rubber tires need not be disposed of, and the social problem with the disposal of waste tires can be overcome. While the present invention has been described in its preferred embodiments, it is to be understood that the present invention is by no means limited to the details of those embodiments but may be otherwise embodied.

While the present invention has been described in its preferred embodiments, it is to be understood that the present invention is by no means limited to the details of those embodiments but may be otherwise embodied.

For example, the worn solid tires 16 employed according to the present invention may be waste solid tires obtained by recovery of so-called solid rubber tires, i.e., common rubber-based solid tires that are widely used in forklift trucks, industrial tractors, battery carriers, trailers, or the like. In addition, the worn solid tires 16 may be solid tires that are formed of a common solid rubber and are used as, e.g., wheels of a cart or casters of a baggage. Moreover, the worn solid tires 16 may be pneumatic-type solid tires or cylindrical-base-type solid tires, and the present invention is applicable to the respective solid-rubber portions of those tires.

In the composite solid tire producing method shown in FIGS. 3 and 4, the worn solid rubber tire 16 is detached from the wheel 18, and subsequently is set in the die-casting device 32, and then the polyurethane elastomer layer 24 is integrally formed on the outer circumferential surface of the rubber layer 20 of the tire 16. However, it is possible to set, in the die-casting device 32, the worn solid rubber tire 16 that is not detached from the wheel 18 but remains attached to the wheel 18, and integrally form the polyurethane elastomer layer 24 on the outer surface of the rubber layer 20 of the tire 16.

The polyurethane raw materials 42 used to form the polyurethane elastomer layer 24 do not contain any amounts of carbon black as a reinforcing material, but may contain one or more known additives such as a coloring agent to add a desired color to the elastomer layer 24; an antibacterial agent to give an antibacterial activity to the layer 24; a photocatalyst; or an ultraviolet-ray absorbing agent.

In each of the illustrated embodiments, the worn solid tire, to which the present invention is applicable, is used to produce the renewed solid tire. However, it is to be understood that the present invention is by no means limited to the details of those embodiments but may be otherwise embodied. For example, it is possible to form a new annular rubber layer for an inner circumferential portion of the solid tire, and form the thermo-setting polyurethane elastomer layer having an appropriate thickness on the outer circumferential surface of the rubber layer, for thereby obtaining the desired composite solid tire.

It is desirable that the rubber-layer of the above-mentioned composite solid tire, in which the thermo-setting polyurethane elastomer layer is formed on the outer circumferential surface of the rubber layer, is formed of at least one material, which is softer than the thermo-setting polyurethane elastomer. Generally, the rubber layer is formed of a rubber, whose hardness (Shore A hardness) is 70 A or lower. It is also possible to employ a composite rubber structure, wherein a core is formed of a relatively soft rubber, and the core is covered by another rubber layer, which is harder than the core.

It is to be understood that the present invention may be embodied with other changes, modifications, and improvements that may occur to a person skilled in the art, without departing from the spirit and scope of the present invention.

What is claimed is:

1. A method of producing a composite solid tire, comprising the steps of
    providing a rubber layer to be an inner layer of said tire;
    applying a primer and an adhesive to the outer circumferential surface of said rubber layer;
    providing a die-casting device including an outer die having a cylindrical shape with a bottom;
    pre-heating the outer die and the rubber layer individually, the outer die being heated to a temperature of 100° C. to 110° C. and the rubber layer being heated to a temperature 5° C. higher than that of the pre-heated outer die;
    setting the pre-heated rubber layer and the preheated outer die concentrically such that a casting space is formed between an inner circumferential surface of the outer die and the outer circumferential surface of the rubber layer; and
    introducing raw materials of a thermo-setting polyurethane elastomer into the casting space to react and cure, thereby integrally forming an outer layer of the thermo-setting polyurethane elastomer.

2. The method of producing a composite solid tire according to claim 1, wherein said rubber layer is formed of a worn solid rubber tire, and the rubber layer has a pre-determined thickness.

3. The method of producing a composite solid tire according to claim 1, wherein said rubber layer is formed of at least one rubber material, which is softer than the thermo-setting polyurethane elastomer of the outer layer.

4. The method of producing a composite solid tire according to claim 1, wherein a characteristic value of the thereto-setting polyurethane elastomer according to Taber Abrasion Test measured in accordance with DIN 53516 is 90 mm$^3$ or less.

5. The method of producing a composite solid tire according to claim 1, wherein a percentage of a thickness of the outer layer relative to a whole thickness of said composite solid tire in a radial direction thereof is not more than 40%.

6. The method of producing a composite solid tire according to claim 1, wherein said outer layer is formed by reacting and setting of at least one polyisocyanate component selected from the group consisting of tolylene diisocyanate (TDI), diphenylmethane diisocyanate (MDI), and naphthalene diisocyanate (NDI), and at least one polyol component selected from the group consisting of poly(oxybutylene)glycol, polyester polyol, and polyethylene adipate glycol.

7. The method of producing a composite solid tire according to claim 6, wherein said at least one polyisocyanate component and said at least one polyol component are reacted and set at a temperature of 70° C. to 115° C.

8. A method of producing a composite solid tire, the method comprising the steps of
    cutting an outer circumferential surface of a remaining rubber layer of a worn solid rubber tire;
    applying a primer and an adhesive to the cut outer circumferential surface of the rubber layer;
    providing a die-casting device including an outer die having a cylindrical shape with a bottom;
    pre-heating the outer die and the rubber layer individually, the outer die being heated to a temperature of 100° C. to 110° C. and the rubber layer being heated to a temperature 5° C. higher than that of the pre-heated outer die;
    setting the pre-heated rubber layer and the preheated outer die concentrically such that a casting space is formed between an inner circumferential surface of the outer die and the outer circumferential surface of the rubber layer; and
    introducing raw materials of a thermo-setting polyurethane elastomer into the casting space to react and cure, thereby integrally forming an outer layer of the thermo-setting polyurethane elastomer.

9. The method of producing a composite solid tire according to claim 8, wherein said rubber layer is formed of a worn solid rubber tire, and the rubber layer has a pre-determined thickness.

10. The method of producing a composite solid tire according to claim 8, wherein said rubber layer is formed of at least one rubber material, which is softer than the thermo-setting polyurethane elastomer of the outer layer.

11. The method of producing a composite solid tire according to claim 8, wherein a characteristic value of the thermo-setting polyurethane elastomer according to Taber Abrasion Test measured in accordance with DIN 53516 is 90 mm$^3$ or less.

12. The method of producing a composite solid tire according to claim 8, wherein a percentage of a thickness of the outer layer relative to a whole thickness of said composite solid tire in a radial direction thereof is not more than 40%.

13. The method of producing a composite solid tire according to claim 8, wherein said outer layer is formed by reacting and setting of at least one polyisocyanate component selected from the group consisting of tolylene diisocyanate (TDI), diphenylmethane diisocyanate (MDI), and naphthalene diisocyanate (NDI), and at least one polyol component selected from the group consisting of poly(oxybutylene)glycol, polyester polyol, and polyethylene adipate glycol.

14. The method of producing a composite solid tire according to claim 13, wherein said at least one polyisocyanate component and said at least one polyol component are reacted and set at a temperature of 70° C. to 115° C.

* * * * *